United States Patent [19]
Desbiolles et al.

[11] Patent Number: 5,078,400
[45] Date of Patent: Jan. 7, 1992

[54] WEIGHT DISTRIBUTION OF THE HEAD OF A GOLF CLUB

[75] Inventors: Jacques Desbiolles; Joseph Morell; Denis Gasquet, all of Annecy, France

[73] Assignee: Salomon S. A., Annecy Cedex, France

[21] Appl. No.: 448,009

[22] Filed: Dec. 8, 1989

Related U.S. Application Data

[63] Continuation-in-part of Ser. No. 193,297, Apr. 22, 1988, abandoned, and a continuation-in-part of Ser. No. 193,298, Apr. 22, 1988, abandoned.

[30] Foreign Application Priority Data

Aug. 28, 1986 [FR] France .............................. 86 12515
Aug. 28, 1986 [FR] France .............................. 86 12516

[51] Int. Cl.[5] ............................................. A63B 53/04
[52] U.S. Cl. ........................ 273/167 F; 273/169; 273/171
[58] Field of Search ................. 273/169, 167 F, 171, 273/173, 167 R-167 E, 167 G-168, 77 A, 77 R, 80 A, 80.2

[56] References Cited

U.S. PATENT DOCUMENTS

| | | | |
|---|---|---|---|
| 1,258,212 | 5/1918 | Goodrich | 273/169 |
| 1,993,928 | 3/1935 | Glover | 273/169 |
| 2,608,409 | 9/1949 | Pinkerton | 273/169 |
| 2,686,056 | 8/1954 | Oquist | 273/167 F |
| 3,064,980 | 11/1962 | Steiner | 273/171 |
| 3,429,576 | 2/1969 | Ikeda | 273/169 X |
| 3,625,513 | 12/1971 | Ballmer | 273/167 F X |
| 3,941,390 | 3/1976 | Hussey | 273/169 |
| 3,955,820 | 5/1976 | Cochran et al. | 275/167 F |
| 3,995,857 | 12/1976 | Cochran et al. | 273/77 A |
| 4,214,754 | 7/1980 | Zebelean | 273/167 H |
| 4,220,336 | 9/1980 | Kochenvar | 273/169 X |
| 4,607,846 | 8/1986 | Perkins | 273/171 |
| 4,754,977 | 7/1988 | Sahm | 273/169 X |
| 4,867,458 | 9/1989 | Sumikawa et al. | 273/171 |

FOREIGN PATENT DOCUMENTS

| | | | |
|---|---|---|---|
| 29603 | of 1914 | United Kingdom | 273/169 |
| 359487 | 11/1931 | United Kingdom | 273/169 |
| 1232651 | 5/1971 | United Kingdom | 273/171 |
| 1297239 | 11/1972 | United Kingdom | . |
| 2133295 | 7/1984 | United Kingdom | 273/171 |
| 2170719 | 8/1986 | United Kingdom | 273/169 |

Primary Examiner—Edward M. Coven
Assistant Examiner—Sebastiano Passaniti

[57] ABSTRACT

Golf clubs are disclosed having weighted tips and weighted hosels so as to achieve a predetermined weight distribution in both the horizontal and vertical direction. The distance between the hosel and tip weights is maximized as a result of their respective geometries relative to the center of gravity of the club head, and the stability of the club head is increased both about a horizontal axis and about a vertical axis through the center of gravity. In one version the tip weight is at least twice the weight at the hosel and in another version these weights are substantially indentical.

7 Claims, 7 Drawing Sheets

WEIGHT DISTRIBUTION OF THE HEAD OF A GOLF CLUB

This is a continuation-in-part of co-pending application Ser. No. 193,297 and 193,298 filed on Apr. 22, 1988, now abandoned.

The present invention relates to a head for a golf club, and deals more particularly with improvements to the weight distribution in the club head and hosel so as to achieve improved directional control and azimuth control of the golf ball when struck. This application combines the disclosures in co-pending applications Ser. No. 193,297 and Ser. No. 193,298 filed Apr. 22, 1988 and is a continuation-in-part of each such co-pending application. The additional disclosure added to each such application is merely that of the other application.

In games of golf, the accuracy of the shot depends on a certain number of parameters and in particular human parameters. The movement or path of the club head before striking must be more or less precise and the position of the head of the club at the time of impact must be more or less sound with respect to the ball. Now golf players know that the least inaccuracy at the time of striking the ball has serious consequences. In fact, at the time of impact, the point of impact of the ball on the striking face should be located perfectly on a straight line joining the center of gravity of the ball and the center of gravity of the head of the club. If this condition is not achieved at the time of impact, the head of the club, under the effect of the impact, will pivot and the striking face will open or close and the trajectory of the ball will not be as desired. If the striking face opens, the ball will travel in a sliced direction and if the striking face closes, the ball will travel in a hooked direction. The present club heads are not very tolerant in this respect and it is necessary to strike the balls with great accuracy.

The present invention seeks to solve these problems posed for the golfer's swing and to provide less accurate swings with more acceptable results. This is accomplished by a unique vertical weight distribution system to be described.

Two versions of the present invention are disclosed, one having a weight distribution that is non-uniform horizontally of the club head, and that includes peaks in the weight distribution adjacent the tip of the club head and to a lesser extent in the hosel area of the golf club.

In the second version of the invention the weight distribution horizontally of the club head is relatively constant, and although weights are preferably added to the tip of the club head and to the hosel area the purpose of these weights is to contribute to this generally uniform horizontal weight distribution.

In both the above described club heads the present invention provides for the tip weight and the hosel weight to be spaced vertically with respect to one another in such a way as to achieve a degree of stability about a vertical axis through the center of gravity that complements the stability of the club head about a horizontal axis through the center of gravity of the club head in such a way as to achieve results for the golf club head of the present invention not possible with prior art club heads generally and the following prior art references in particular:

U.S. Pat. No. 3,955,820 issued to Cochran et al in 1976 suggests providing horizontally spaced weights in the club head to achieve improved stability on an axis generally between the vertical and the horizontal. Cochran refers to this axis as a radius of gyration through the center of gravity of the club head and suggests it be generally parallel to the axis of the golf club shaft. Cochran does not teach achieving stability about both a horizontal and a vertical axis through the center of gravity of the club head. As a result of providing a weight at the golf club tip well below the center of gravity and a weight in the hosel area well above the center of gravity Applicant has reoriented the radius of gyration so that is not only not parallel to the golf club shaft, but is instead oriented either vertically or on the other side of vertical from that suggested in Cochran.

British Patent No. 2170719 issued to Kajita et al and published Aug. 13, 1986 suggests that weights might be added to both the tip and the hosel area of a golf club, but Kajita like Cochran merely suggests a conventional location for such weights where both are provided well above a horizontal plane through the center of gravity of the club head.

Finally, another British Patent No. 359487 issued in 1931 to Mavis Machine Corporation teaches that in the 1930's it was common to provide a golf club head of uniform thickness through a major portion of the club head (excluding the hosel). In Mavis, however, the juncture between the club head and the hosel (termed the neck) is of reduced sectional size so as to provide a horizontal weight distribution in the resulting club head that is far from uniform.

The present invention provides for a tip weight below the center of gravity when the club head is rested on the ground in the so called "address" position, and provides a hosel weight well above the center of gravity of the club head. In one version the horizontal weight distribution of the club head has pronounced peaks at the tip and hosel the former being approximately twice the weight of the latter. In a second version a uniform weight distribution is achieved horizontally and the above described tip and hosel weights are provided below and above, respectfully, the club head center of gravity. This geometry provides improved stability for the club head, and the club head is more tolerant to errors induced by the golfer in contacting the ball on a line that is displaced from the line between the center of gravity of the ball and that of the club head.

FIG. 6 illustrates the horizontal weight distribution of the club head illustrated in FIGS. 4 and 5.

FIG. 13 shows graphically the horizontal weight distribution in the iron club head and hosel of FIGS. 11A and 12A.

Figure 1:
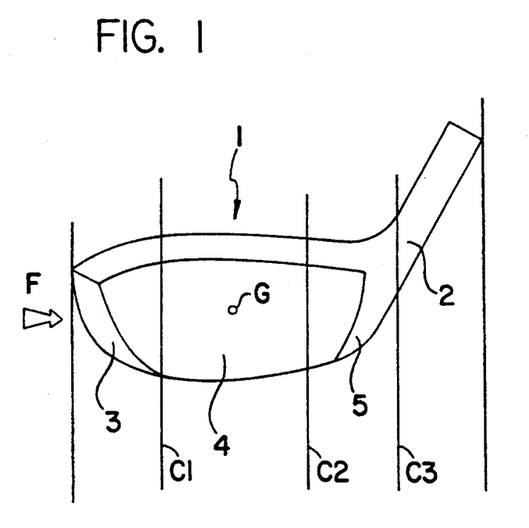
FIG. 1 shows a front elevational view of a conventional golf club head.
Figure 2:
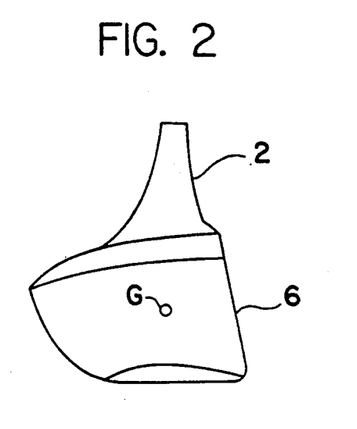
FIG. 2 is an end view thereof.
Figure 3:
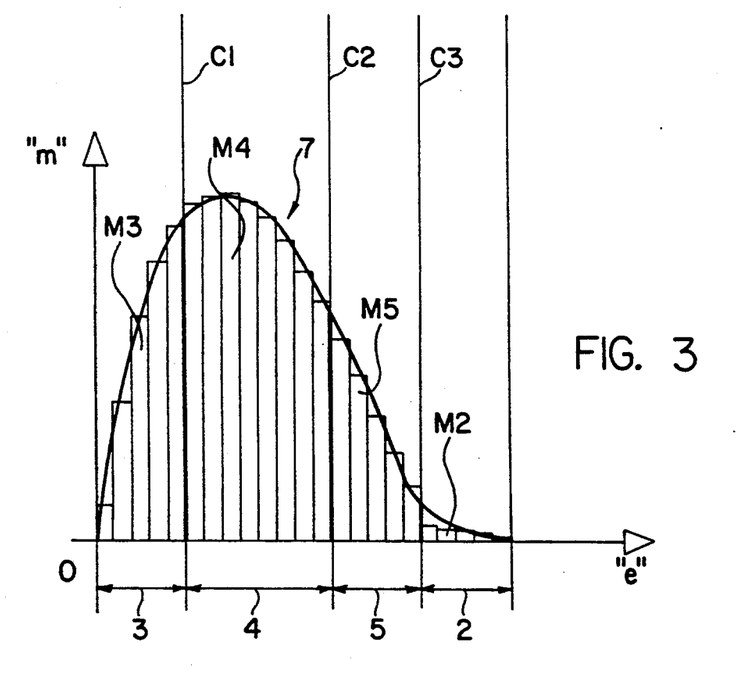
FIG. 3 shows the horizontal weight distribution along the club head of FIG. 1.

Historically golf clubs have developed from the traditional head of the type illustrated in FIGS. 1 and 2 (sometimes referred to a "wood") where the weight is distributed horizontally in the form of a bell shaped curve. In such a traditional club head the center of gravity is located generally in the central part 4. As illustrated in FIG. 3 the weight distribution curve 7 of this traditional head can be conveniently divided into three parts, a tip 3, a central part 4, and a heel 5. The heaviest part corresponds to central part 4 and the further one moves toward the tip 3 or hosel 2 the more the weight decreases with the result that the weight at the hosel is generally low as is the weight at the very tip.

By way of example a number 1 wood or driver has a total weight M of the club head equal approximately to 200 grams. If the designations M2, M3, M4 and M5 comprise the respective weights of the hosel 2, tip 3, central part 4 and heel 5. M2 is approximately 3 grams in such a club head, M3 47 grams, M4 120 grams, and M5 30 grams. While the actual weights may be different depending upon where the divisions are made the overall curve 7 will remain as illustrated for a so called conventional or traditional club head.

Figure 4:
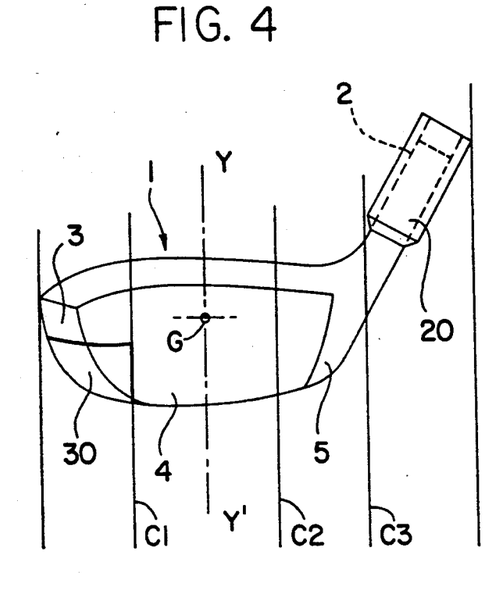
FIG. 4 is front elevational view showing a club head with a weight distribution according to one version of the present invention.
Figure 5:
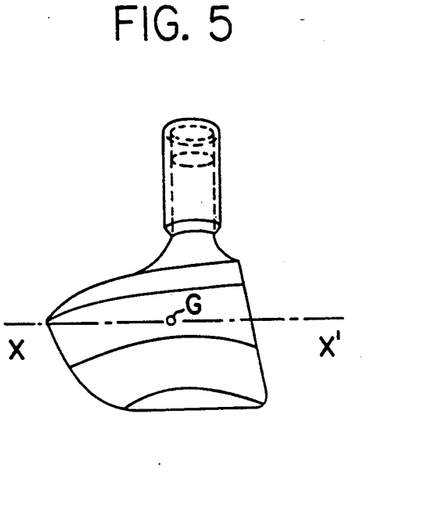
FIG. 5 is an end view thereof and FIG. 6 shows the horizontal weight distribution of the club head illustrated in FIGS. 4 and 5.
Figure 6:
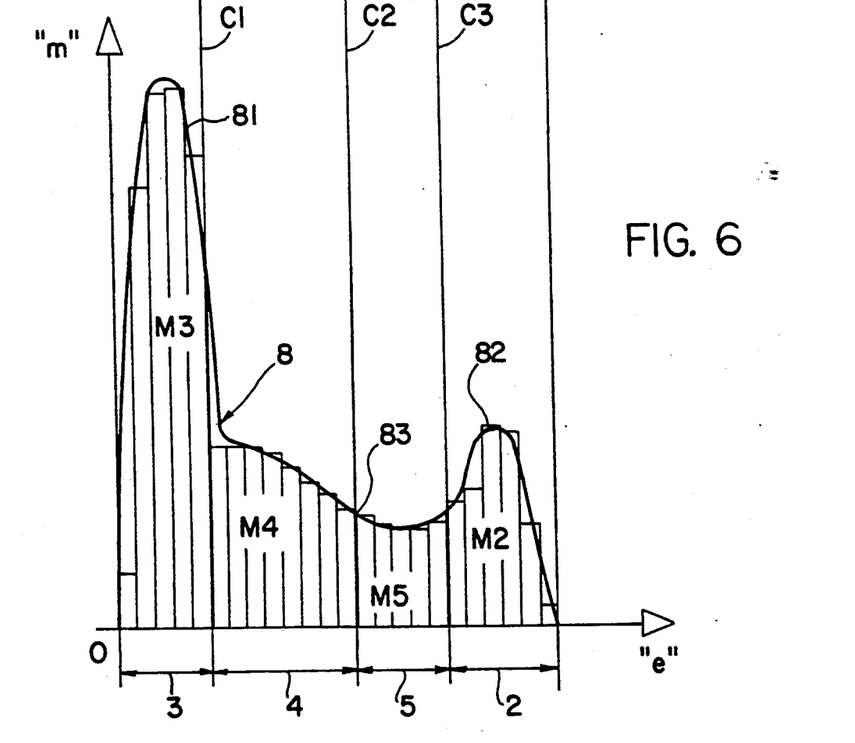

FIGS. 4 and 5 illustrate a club head constructed in accordance with the present invention wherein the wood has an overall weight M that might be comparable in magnitude to the weight M of a traditional club head, but which is distributed at least horizontally as illustrated in FIG. 6. Thus, the weight distribution of the improved club head of FIGS. 4 and 5 is illustrated by the curve 8 in FIG. 6 where the curve has two peaks 81 and 82 separated by a central depression or valley 83. It will be apparent that weight has been added to the hosel 2 and to the tip 3 in order to make these regions of heavier construction, while the weight of the central or striking part 4 and heel 5 have been significantly reduced. In a golf club head such as a number one wood, or driver, weighing approximately two hundred grams the distribution might be as follows: M3 equals 86 grams, M4 equals 58 grams, M5 equals 21 grams, M2 equals 35 grams.

It should be noted that the peak 81 defined by the tip weight 30 is in fact located closer to a vertical axis Y—Y' through the center of gravity G than is the weight 20 that defines the tip 82 associated with the hosel. In fact, these weights 30 and 20 are spaced from the vertical axis YY' by horizontal distances that are inversely related to the magnitude of the weights themselves.

It should also be noted that the tip weight 30 is spaced below a horizontal axis X—X' through the center of gravity G and that the hosel weight 20 is provided well above the axis X—X' and that the same displacement relationship applies namely that the hosel weight 20 is spaced above this line X—X' by a distance significantly greater than the distance that the tip weight 30 is below this line X—X'. In fact, these distances bear the same inverse relationship to the respective weights with which they are associated.

Figure 4A:
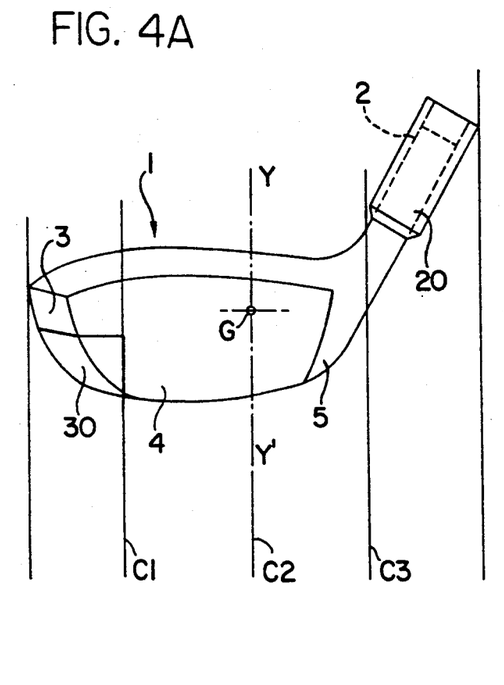
FIG. 4A is a front elevational view of a club head and hosel constructed in accordance with an alternative version of the present invention.
Figure 5A:
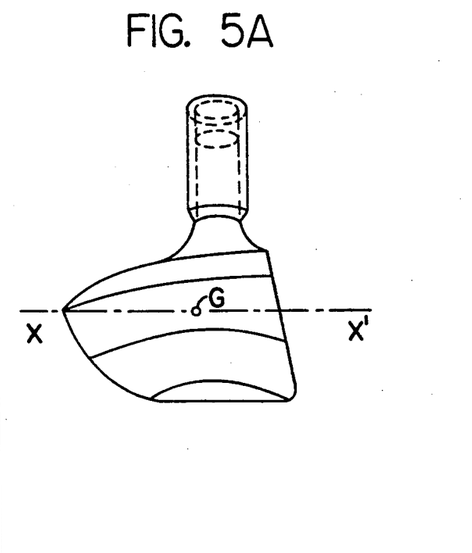
FIG. 5A is an end view thereof.
Figure 6A:
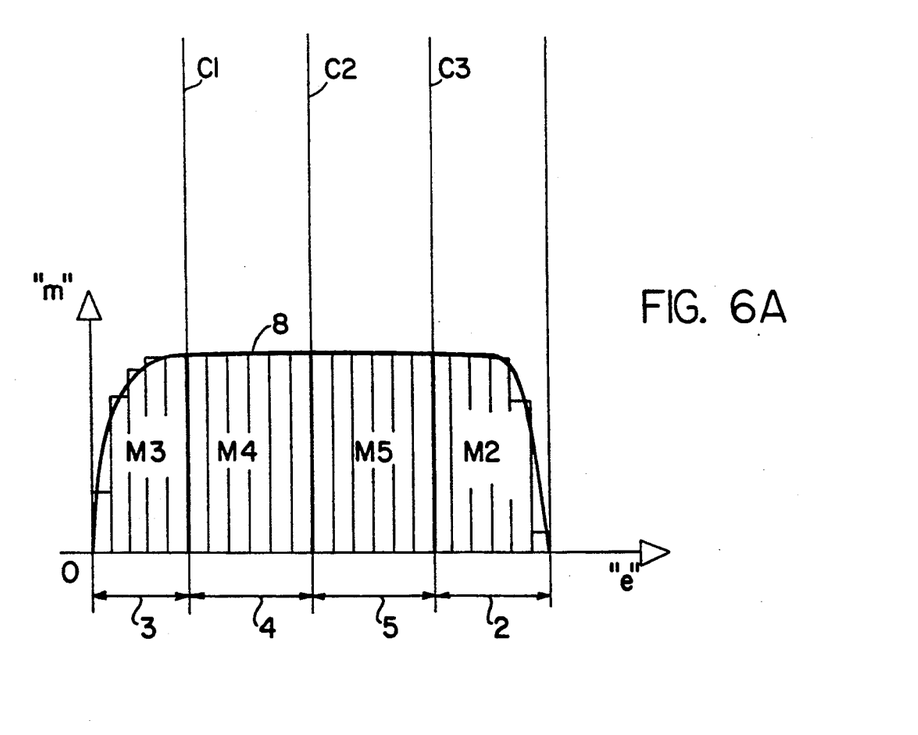
FIG. 6A shows the weight distribution of the club head shown in FIGS. 4A and 5A.
Figure 7A:
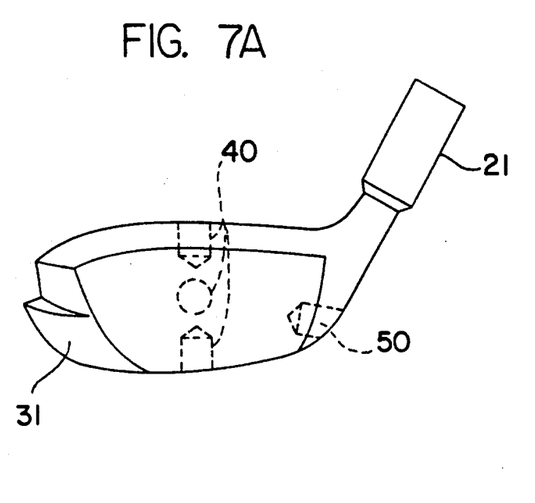
FIGS. 7A and 7B illustrate variations in the geometry of the club heads illustrated in FIGS. 4 and 5 and FIGS. 4A and 5A, which variations in geometry are intended to achieve weight distributions as suggested in FIGS. 6 and 6A respectively.
Figure 7B:
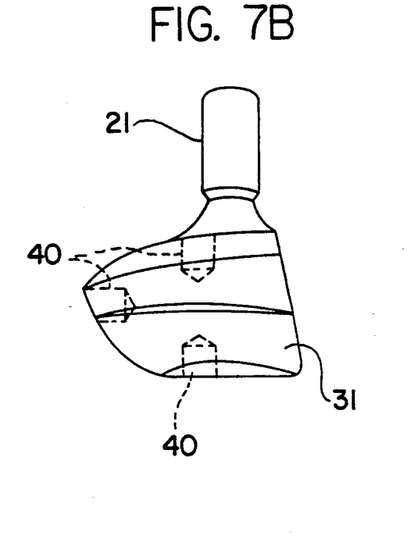

In the embodiment of FIGS. 4A, 5A and 6A the above described relationships between the tip weight and the hosel weight still apply. That is, the tip weight 30 and the hosel weight 20 in FIGS. 4A, 5A and 6A are approximately equal, as are their respective distances from both the horizontal and vertical reference planes X' an Y'. However, the tip weight 30a of FIG. 4A is not as great as is the tip weight 30 of FIG. 4, and the hosel weight 20a is greater than the hosel weight 20 of FIG. 4. The tip and hosel weights are provided on opposite sides of the Y—Y" axis and the displacements of these weights 30a and 20a from this axis Y—Y' are equal and do bear the same inverse relationship to the magnitude of these weights 30a and 20a. By way of example, in a 200 gram club head the tip weight M3 should be approximately 34 grams and the hosel weight 38 grams. The weight M4 and M5 are uniform per unit of horizontal displacement as suggested in FIG. 6A and total about 128 grams.

As best shown in FIG. 5A the axis X—X' provided through the center of gravity G will result in the tip weight 30a being below this X—X' axis and the hosel weight 20a being well above this axis. In this version the weights M4 and M5 are significantly greater than the weights M4 and M5 in the previously described embodiment with the result that the vertical spacing of hosel weight 20a above the axis X—X' is compensated for. So too, the tip weight 30a and the hosel weight 20a are about equal to one another in magnitude, and therefore are located equidistantly from both the vertical Y—Y' and the horizontal X—X' axes.

The weight distribution for the club head of FIGS. 4A and 5A is illustrated in FIG. 6A. In this view it will be apparent that the center of gravity is located midway between the weights M4 and M5 with the result one can describe from the following magnitudes to the various weighted segments of the club head: M3 is approximately 34 grams, M4 equals 64 grams, M5 equals 64 grams and finally the hosel weight M2 equals 38 grams. If we look at the horizontal weight distribution and attempt to quantify the inertial characteristics of this club head we have $M3 \times D3 + M4 \times D4$ equals $M5 \times D5 + M2 \times D2$. D3 refers to the distance M3 lies from the vertical reference plane Y, Y' as does D4 relate to the distance M4 from the same plain and so forth. By definition M3 is approximately equal to M2 (34 grams is approximately equal to 38 grams) and M4 equals M5 (64 equals 64) thus, the above equation provides the following information: D3 is approximately equal to D2. Thus, this relationship satisfies the above described relationship for the version in FIGS. 4, 5 and 6 wherein the values M3 and M2 were stated to be inversely proportional to the displacements D3 and D2 of each relative to the center of gravity G. The vertical axis YY' passes through the center of gravity G of the club head (FIGS. 4, 5, and 6). The above identified equation can be simplified giving the fact that M3 is at least approximately twice M2, and by assuming that M4×D4 is approximately equal M5×D5 we are left with the relationship that D2 equals 2×D3.

Figure 8A:
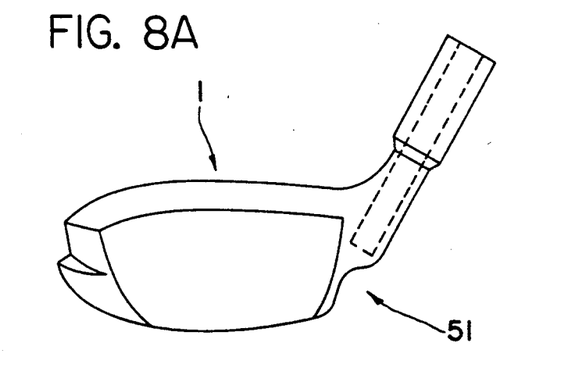
FIGS. 8A and 8B show still another variation for the club head geometry noted to achieve the same weight distributions as depicted in FIGS. 6 and 6A.
Figure 8B:
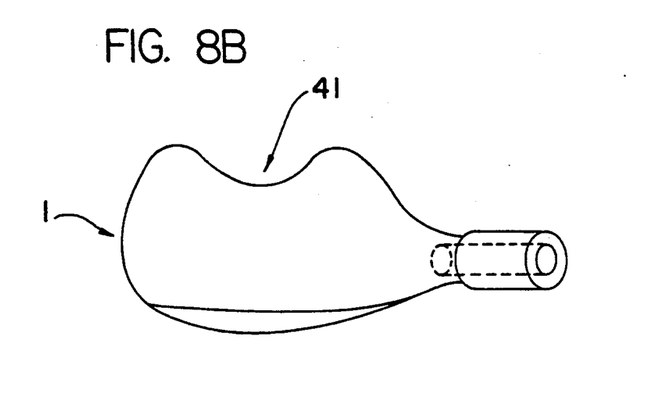

The foregoing weight distribution relationships may be obtained by several different means. For example, one can construct the entire head with a relatively light material such as his true and certain present day metal "woods". Composite plastic and fiber materials can also be used to fabricate present day woods. The tip weights 30 and 30a and hosel weights 20 and 20a can also be fabricated of higher density material as for example lead, steel, or tungsten. As shown in FIGS. 8A and 8B the physical shape of the hosel and heel can be increased in order to provide sufficient weight to satisfy the weight distribution curves of FIGS. 6 and 6A. Furthermore, in the FIG. 6 version, weights M2 and M3 may be reduced by physically reducing the central part 4 and the heel 5 as by providing holes 40 and 50 as illustrated in FIGS. 8A and 8B.

Figure 9A:
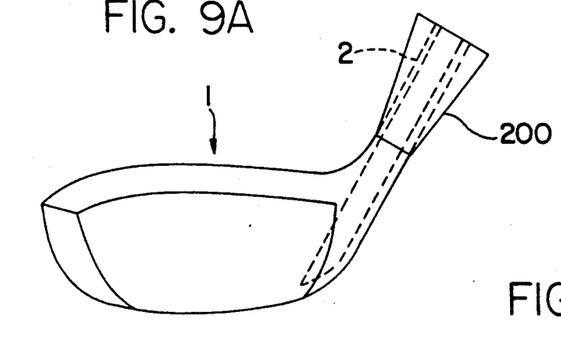
FIGS. 9A, 9B, 9C, and FIG. 10 show still further variations for the geometry and internal configuration of the club head to achieve the weight distributions depicted in FIGS. 6 and 6A.
Figure 9B:
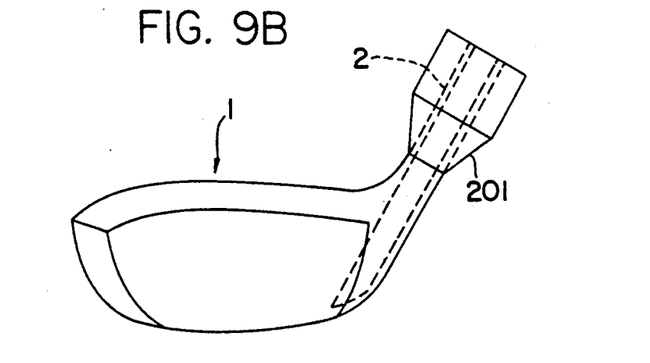
Figure 9C:
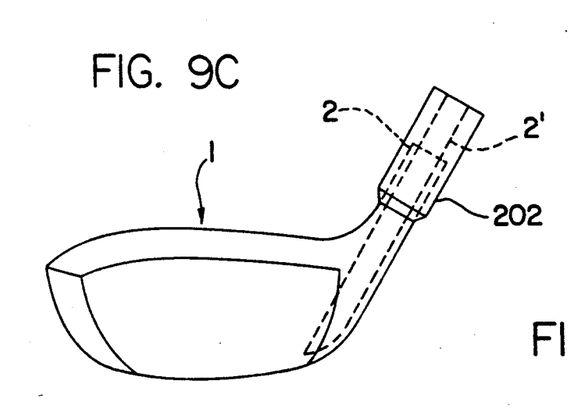

The increase in size and weight of the hosel or neck may take different forms as shown in FIGS. 9A, 9B and 9C. The extra weight 200 of FIG. 9A is conical and the extra weight 201 of FIG. 9B is cylindrical and conical. The weight 202 in FIG. 9C is cylindrical and extends upwardly beyond the end of the hosel.

Figure 10:
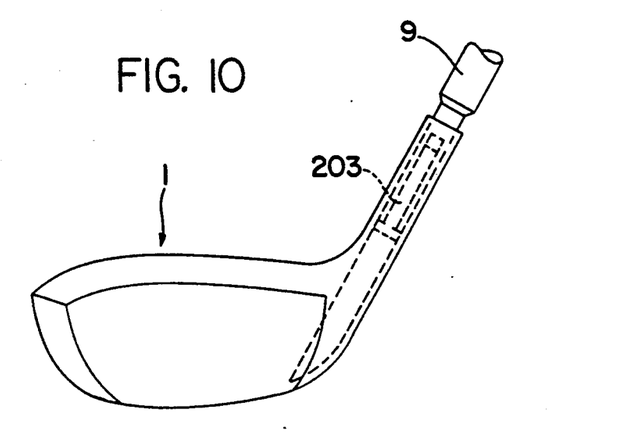

Internal weights can also be provided as suggested in FIG. 10 at 203. It is contemplated that the weight 203 be in the range of 15 to 40 grams for a golf club head "wood" of approximately 200 grams overall weight.

Figure 11:
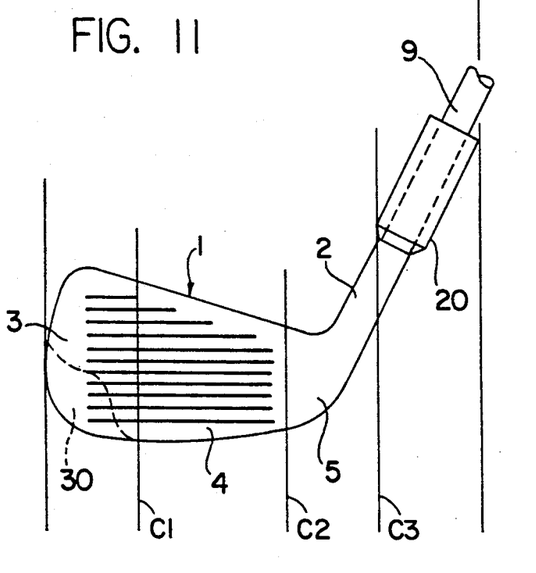
FIG. 11 shows a front elevational view of still another version of the present invention where the unique weight distribution advantages in the wood club head and the preceding views is carried over to a golf club iron.
Figure 11A:
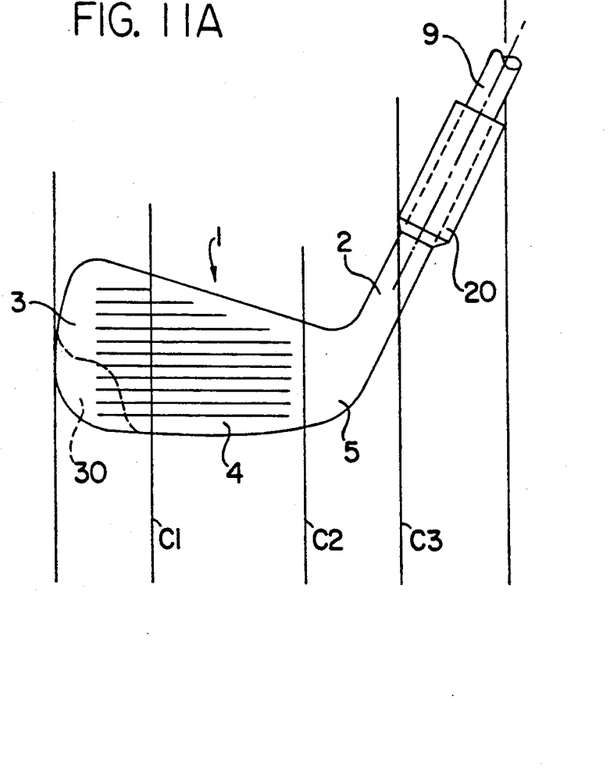
FIG. 11A shows a front elevational view of a golf club iron having the same appearance as that of FIG. 11, but as illustrated in FIG. 13A with a general uniform weight distribution horizontally across the club face and hose.
Figure 12:
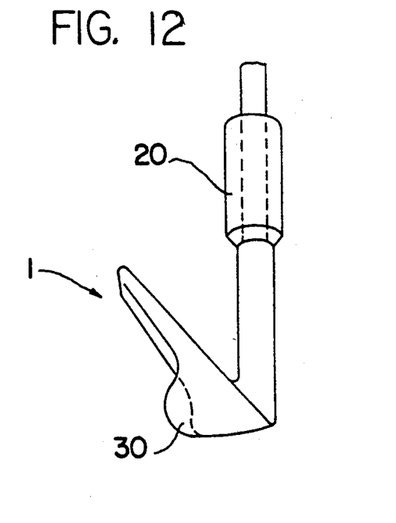
FIG. 12 is a front end view thereof.
Figure 12A:
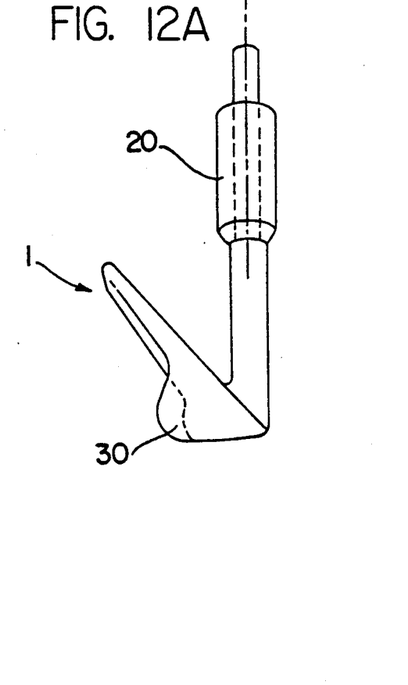
FIG. 12A is an end view of FIG. 11A
Figure 13:
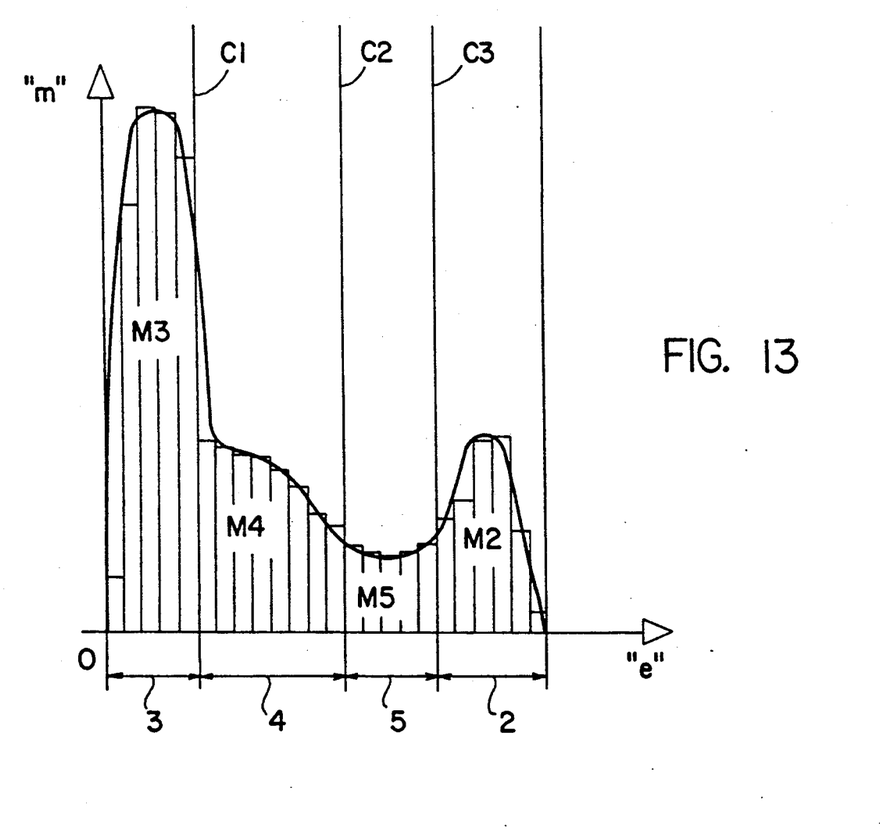
FIG. 13 shows the horizontal weight distribution for the club of FIGS. 11 and 12 wherein the weight of the tip is significantly greater than the central portion and at least twice that of the hosel weight.
Figure 13A:
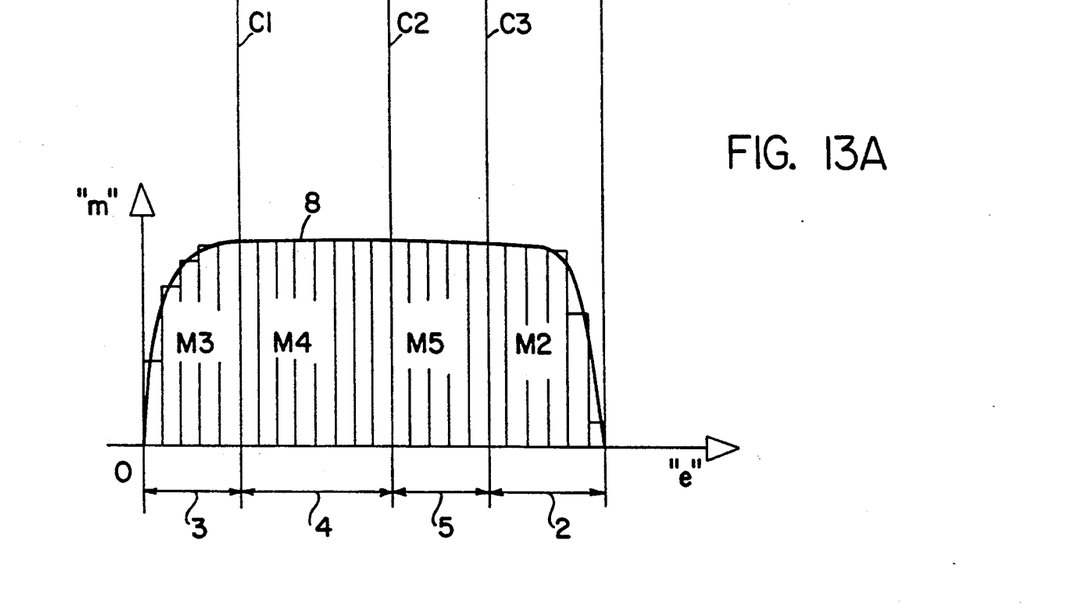
FIG. 13A shows the horizontal weight distribution for the club of FIGS. 11 and 12 wherein the weight of the tip is substantially equal to the weight of each of the central part, the heel and the hosel.

FIGS. 11 and 12 show the same tip and hosel weighting applied to a golf club iron. The tip and hosel weights of FIG. 11 can be provided to yield the weight distributions of either FIG. 6 or 6A depending upon the results desired. It is important to note that the counter-weights 30 and 31 located at the lower part of the tip 3 are in fact spaced below the horizontal axis X—X' and below the center of gravity G of the overall head. This center of gravity is located slightly above that of a club head with a conventional striking face and this fact can be attributed to the hosel weight being spaced above the horizontal axis X—X'. Very good stability about the axis X—X' is achieved without sacrifice to the stability achieved on the Y—Y' axis.

In conclusion this invention teaches that weights be provided at the hosel and tip of the golf club head, and that these weighted parts be located remotely from the center of gravity both horizontally and vertically. This arrangement increases the inertia of he club head so that he face of the club is more stable when swung in a direction or orientation that is not that of a perfectly executed golf swing. The distance between the hosel weight and the tip weight is maximized as a result of these locations in the club head.

We claim:

1. A golf club head comprising a tip of weight M3, a central part of weight M4, a heel of weight M5, and a hosel of weight M2, said tip including a tip weight (30) and said hosel including a hosel weight (20) which weights (30 and 20) cooperate to define a center of gravity of the club head G that is provided generally between the tip weight (30) and the hosel weight (20), said tip and said hosel weights, (30 and 20), respectively, being located below and above, respectively, a horizontal axis X—X' through said center of gravity, and the magnitude of said weights (30 and 20) being inversely proportional, respectively, to the horizontal spacing between said weights (30 and 20) and said center of gravity of the club head.

2. The golf club head according to claim 1 wherein said tip weight (30) has a magnitude of at least twice that of said hosel weight (20), said hosel weight being horizontally spaced from a vertical axis Y—Y' drawn through the center of gravity of the club head a distance at least twice that of the horizontal spacing of said tip weight (30) from said club head center of gravity.

3. The golf club head according to claim 1 wherein said tip weight (30) and said hosel weight (20) are substantially equal to one another and are equally spaced horizontally from a vertical axis Y—Y' drawn through the center of gravity of the club head G.

4. The golf club head according to claim 2 above wherein the club head and the hosel have a combined horizontal weight distribution characterized by peaks at the tip and the hosel, said peaks defining a depression or valley therebetween.

5. The golf club head according to claim 3 above wherein said central part and said heel have substantially the same weight per unit of distance in the horizontal direction as the weight per unit of distance in the horizontal direction of the tip and the hosel.

6. The golf club head according to claim 1 above wherein the hosel weight (20) comprises a weight in the range between 15 grams and 40 grams.

7. The golf club head according to claim 6 above wherein the hosel weight (20) is between 30 grams and 40 grams.

* * * * *